June 24, 1952 W. H. SOHN ET AL 2,601,232

COVER RETAINING MECHANISM

Filed March 27, 1947

INVENTORS
William H. Sohn and
Harley B. Lindemann
BY
Hyman Diamond
ATTORNEY

Patented June 24, 1952

2,601,232

UNITED STATES PATENT OFFICE 2,601,232

COVER RETAINING MECHANISM

William H. Sohn and Harley B. Lindemann, Baltimore, Md., assignors, by mesne assignments, to the United States Government as represented by the Secretary of the Navy Application March 27, 1947, Serial No. 737,632

2 Claims. (Cl. 292—4)

This invention relates to a mechanism for retaining close fitting covers or lids on containers, for example, the cover or lid for a radio cabinet containing a chassis which requires shielding against high frequency electric fields, and it is an object of this invention to provide improved apparatus of this type.

A further object is to provide a simple effective retaining mechanism comprising fewer parts than the prior art mechanisms.

A still further object is to provide an improved retaining mechanism wherein all of the parts of the mechanism are enclosed.

A still further object is to provide an improved retaining mechanism having no detachable parts.

A still further object is to provide an improved retaining mechanism that may easily be operated with a screwdriver, or the like, in cramped or close places.

These and other objects are effected by this invention as will be apparent from the following description and claims taken in accordance with the accompanying drawing, forming a part of this application, in which:

Figure 1:
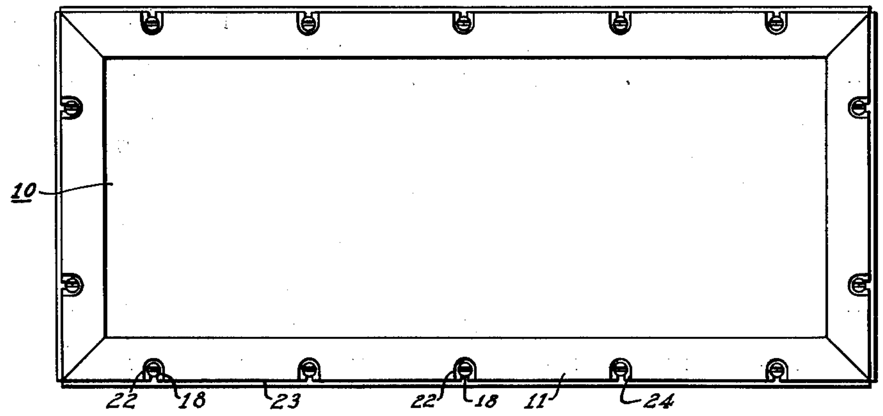
Figure 1 is a bottom plan view showing the retaining mechanism provided by this invention being utilized to retain a lid in position on a radio cabinet.

Referring to the drawing in detail, we show, in Fig. 1, a radio cabinet 10 which encloses a radio chassis. The cabinet 10 is of the type used to house radio and other electronic equipment used by the military services, and it is usually made of some suitable metal. The equipment housed in the cabinet 10 is of the type that should be shielded against high frequency electric fields, and to accomplish this we provide a close fitting cover or lid 11 for the cabinet 10. This lid or cover is usually made of the same type of material as the cabinet 10. An edge of the cabinet 10 is turned down to provide a flange or bearing surface 12 against which the lid or cover 11 is tightly held by our improved retaining mechanism.

The retaining mechanism comprises a plurality of half-round bars 17 which are drilled and tapped at intervals to receive threaded screws 18, and a U-shaped bracket or housing member 20. A bar 17 extends along each side and along each end of the cabinet 10 for substantially the entire length of the sides and ends of the cabinet 10. The heads of the screws 18 are provided with screwdriver slots 25 and they are drilled near their ends and provided with captivating pins 19 which prevent the screws 18 from being backed completely out of the bar 17. The retaining mechanism extends along both sides and both ends of the cabinet 10. It is attached to the cabinet by bolts 21 which extend through the housing member 20 and a wall of the cabinet; however, it is understood that it may be attached to the cabinet by any suitable means. The housing member 20 has arcuate slots 26 cut therein so as to permit the screws 18 to be swung through an arc as illustrated by Fig. 3.

The lid or cover 11 has slots provided therein for receiving the screws 18. An edging member 23 is also provided on the lid or cover 11. This edging member has slots 24 therein for receiving the heads of the screws 18, so that they will not project beyond the edging member.

Figure 2:
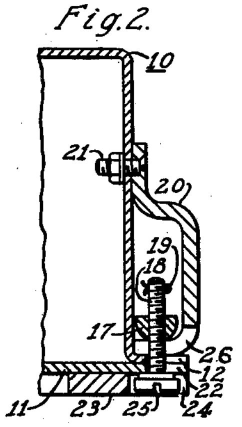
Fig. 2 is a fragmentary section showing the retaining mechanism in closed position.
Figure 4:
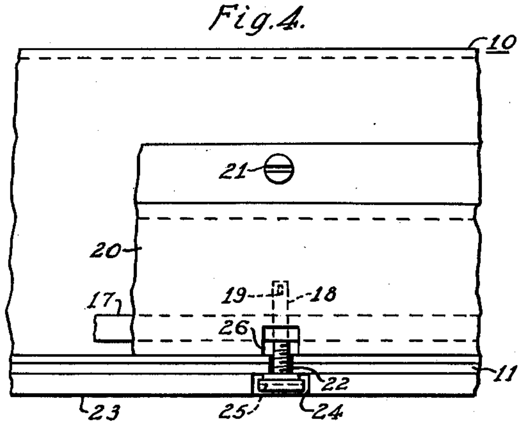
Fig. 4 is a fragmentary side elevation of the apparatus shown in Fig. 2.
Figure 3:
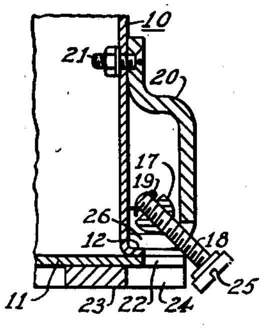
Fig. 3 is a fragmentary section similar to Fig. 2 but showing the retaining mechanism in open position.

To place the lid or cover 11 on the cabinet 10, all of the screws 18 are backed out of the bars 17 and the screws and bars are swung to a position illustrated by Fig. 3. Then the cover 11 is positioned on the flange 12 and the screws are swung to the position illustrated by Fig. 2. Then a screwdriver is used to tighten the screws 18 down to the desired pressure. The bars 17 distribute the pressure along the flange 12 and assure a good tight fit all the way around the cabinet. When the lid or cover 11 is attached to the cabinet 10 in this manner, the contents of the cabinet are well shielded from high frequency electric fields. In this position the retaining mechanism is entirely enclosed thereby eliminating the possibility of destruction of parts of the mechanism as might be the case where threads are exposed or parts of the mechanism protrude beyond the surface of the lid or cover 11.

To remove the lid or cover 11 from the cabinet 10, a screw driver is used to back the screws 18 out of the bars 17 until the screws are far enough out to be swung to the position illustrated by Fig. 3. Then the lid may be lifted off the cabinet.

Figure 5:
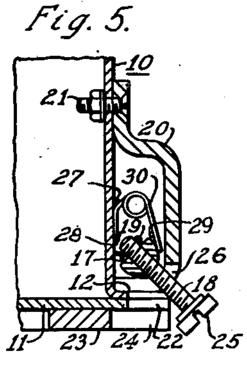
Fig. 5 is a view in section illustrating a modification of our invention.

Alternatively a spring loaded bar 17 as shown in Fig. 5 may be provided. The spring 30 is attached to the wall of the cabinet 10 and to the bar 17 by any suitable method, such as by welding at 27, 28 and 29, and it is so designed that when the screws 18 are loosened or backed out of the bar 17 it will cause the bar 17 to rotate to a position, indicated in Fig. 5, such that the screws 17 will be clear of the lid or cover 11. It is understood that the bar 17 may be spring loaded in any other suitable manner, for example, it may be loaded by winding a coil spring around it. It is also understood that in some instances it might be desirable to use thumbscrews instead of the slotted head screws 18. This arrangement would permit more rapid removal of the lid or cover 11.

All of the parts of our mechanism are at all times secured to the radio cabinet 10 and it is impossible to lose any part of the mechanism, as is often the case with other types of retaining mechanisms, when the lid or cover is removed from the cabinet 10.

Electronic equipment of the type enclosed in the cabinet 10 is often operated and repaired in close quarters, such as on board ships or airplanes, where space is so limited that it would be impossible to operate a nut with a wrench. An advantage of our mechanism is that it can be easily operated with a screwdriver which can be manipulated in much less space than a wrench.

From the foregoing description, it is seen that this invention provides a simple retaining mechanism comprising fewer parts and possessing many advantages over the prior art devices.

While we have shown our invention in but one form, it will be obvious to those skilled in the art that it is not so limited, but is susceptible of various changes and modifications without departing from the spirit thereof, and we desire, therefore, that only such limitations shall be placed thereon as are specifically set forth in the appended claims.

We claim as our invention:

1. In a mechanism for retaining a lid or cover on a container, a housing member, a spring loaded bar in said housing member, and screws having provisions for receiving a screwdriver for operating the same extending into said housing and threaded into said bar.

2. In a mechanism for retaining a lid or cover on a container, a housing member, a spring loaded bar in said housing member, and screws extending into said housing and threaded into said bar.

WILLIAM H. SOHN.
HARLEY B. LINDEMANN.

REFERENCES CITED

The following references are of record in the file of this patent:

UNITED STATES PATENTS

| Number | Name | Date |
|---|---|---|
| 294,683 | Schmidt | Mar. 4, 1884 |
| 358,009 | Baker | Feb. 22, 1887 |
| 419,881 | Proctor | Jan. 21, 1890 |
| 610,537 | Hiser | Sept. 13, 1898 |
| 922,122 | Frazier | May 18, 1909 |
| 2,100,859 | Linde | Nov. 30, 1937 |

FOREIGN PATENTS

| Number | Country | Date |
|---|---|---|
| 4,999 | Great Britain | Oct. 20, 1883 |